United States Patent
Heppner et al.

(10) Patent No.: US 10,843,538 B2
(45) Date of Patent: Nov. 24, 2020

(54) VEHICLE-DOOR ASSEMBLY WITH INSERTION REGIONS ON FRAME-SIDE GUIDE ELEMENTS AND MOUNTING METHOD

(71) Applicant: BROSE FAHRZEUGTEILE GMBH & CO. KOMMANDITGESELLSCHAFT, BAMBERG, Bamberg (DE)

(72) Inventors: Matthias Heppner, Burgkunstadt (DE); Ian Freymuth, Sant Pere de Ribes/Rocamar (ES)

(73) Assignee: Brose Fahrzeugteile GmbH & Co. Kommanditgesellschaft, Bamberg, Bamberg (DE)

(*) Notice: Subject to any disclaimer, the term of this patent is extended or adjusted under 35 U.S.C. 154(b) by 218 days.

(21) Appl. No.: 15/773,918

(22) PCT Filed: Jan. 10, 2017

(86) PCT No.: PCT/EP2017/050363
§ 371 (c)(1),
(2) Date: Jun. 7, 2018

(87) PCT Pub. No.: WO2017/121705
PCT Pub. Date: Jul. 20, 2017

(65) Prior Publication Data
US 2018/0339576 A1 Nov. 29, 2018

(30) Foreign Application Priority Data
Jan. 15, 2016 (DE) .................. 10 2016 200 475

(51) Int. Cl.
B60J 5/04 (2006.01)
B60J 1/17 (2006.01)
B60J 10/79 (2016.01)

(52) U.S. Cl.
CPC ............ *B60J 5/0463* (2013.01); *B60J 1/17* (2013.01); *B60J 10/79* (2016.02); *B60J 5/0402* (2013.01)

(58) Field of Classification Search
CPC ....... B60J 1/17; B60J 1/16; B60J 10/79; B60J 5/0463; B60J 5/0402; E05D 15/165;
(Continued)

(56) References Cited

U.S. PATENT DOCUMENTS 4,240,227 A 12/1980 Hasler et al.
4,567,691 A 2/1986 Warner
(Continued)

FOREIGN PATENT DOCUMENTS

CN 1791728 A 6/2006
CN 105246723 A 1/2016
(Continued)

OTHER PUBLICATIONS

European Examination Report dated Sep. 11, 2019 issued in corresponding EP Application No. 17 701 442.0-1005, 5 pages, with English translation, 2 pages.
(Continued)

*Primary Examiner* — Chi Q Nguyen
(74) *Attorney, Agent, or Firm* — Lewis Roca Rothgerber Christie LLP

(57) ABSTRACT

A vehicle-door assembly including at least a window pane that is adjustable by a vehicle window lifter, wherein the window pane, in a closed state, is flush with upper and/or lateral body parts that bound a window opening to be closed by the window pane of a vehicle door, a door-frame support which defines a door case beneath the window opening, the window pane configured to be lowered into said door case in order to be opened, the door-frame support having at least two lateral frame parts that are located opposite one another
(Continued)

above the door case at the window opening, a first frame-side guide element for laterally guiding the window pane at one of the lateral frame parts, and a second frame-side guide element for laterally guiding the window pane at the other of the lateral frame parts, and first and second pane-side guide elements.

19 Claims, 11 Drawing Sheets

(58) Field of Classification Search
CPC ...... E05D 15/689; E05F 11/382; E05F 11/38; E05Y 2600/53; E05Y 2201/64; E05Y 2900/55
USPC .......................................... 49/502, 440, 441
See application file for complete search history.

(56) References Cited

U.S. PATENT DOCUMENTS

| | | | |
|---|---|---|---|
| 4,604,830 A | 8/1986 | Maeda et al. | |
| 4,608,779 A | 9/1986 | Maeda et al. | |
| 4,611,435 A | 9/1986 | Warner | |
| 4,662,115 A | 5/1987 | Ohya et al. | |
| 4,744,174 A | 5/1988 | Mesnel et al. | |
| 4,874,201 A | 10/1989 | Scaglietti | |
| 4,920,697 A | 5/1990 | Vail et al. | |
| 4,969,293 A | 11/1990 | Guillon | |
| 5,036,621 A | 8/1991 | Iwasaki | |
| 5,040,333 A | 8/1991 | Mesnel et al. | |
| 5,548,930 A * | 8/1996 | Morando ............... | B60J 5/0416 296/146.5 |
| 5,669,668 A * | 9/1997 | Leuchtmann .......... | B60N 2/859 297/408 |
| 5,729,930 A | 3/1998 | Schust et al. | |
| 5,732,509 A | 3/1998 | Buehler et al. | |
| 5,864,987 A | 2/1999 | Mariel et al. | |
| 6,141,910 A | 11/2000 | Kobrehel et al. | |
| 6,536,832 B1 * | 3/2003 | Grimm ................... | B60J 5/0416 296/146.6 |
| 6,732,474 B1 * | 5/2004 | Eck ........................ | B60J 5/0416 49/502 |
| 6,966,149 B2 | 11/2005 | Fenelon | |
| 8,650,802 B2 | 2/2014 | Grudzinski et al. | |
| 2004/0083654 A1 | 5/2004 | Yamamoto et al. | |
| 2006/0037249 A1 * | 2/2006 | Kawamura ............. | B60J 10/74 49/414 |
| 2007/0056219 A1 * | 3/2007 | Martinez Morai .... | B60J 5/0416 49/502 |
| 2007/0261313 A1 | 11/2007 | Ruppert et al. | |
| 2008/0034667 A1 * | 2/2008 | Fischer ................... | B60J 1/17 49/502 |
| 2009/0038232 A1 * | 2/2009 | Kimoto .................. | B60J 5/0405 49/502 |
| 2009/0309391 A1 | 12/2009 | Krause | |
| 2011/0167732 A1 * | 7/2011 | Brancaleone .......... | B60J 5/0402 49/475.1 |
| 2012/0025564 A1 | 2/2012 | Ellis et al. | |
| 2013/0061526 A1 | 3/2013 | Grudzinski et al. | |
| 2013/0276372 A1 | 10/2013 | Lopez et al. | |
| 2015/0165880 A1 * | 6/2015 | Mass ....................... | B60J 10/18 49/490.1 |
| 2016/0107512 A1 * | 4/2016 | List Clausen .......... | B60J 5/0402 49/503 |

FOREIGN PATENT DOCUMENTS

| | | |
|---|---|---|
| DE | 2551450 A1 | 5/1977 |
| DE | 3500791 A1 | 7/1985 |
| DE | 4026215 A1 | 2/1992 |
| DE | 4437532 A1 | 4/1996 |
| DE | 19744810 A1 | 4/1999 |
| DE | 19826040 A1 | 9/1999 |
| DE | 19962988 A1 | 5/2000 |
| DE | 10254989 A1 | 6/2004 |
| DE | 102005052945 B3 | 4/2007 |
| DE | 20 2011 050 329 U1 | 10/2012 |
| DE | 10 2012 214 508 A1 | 3/2013 |
| EP | 0021069 B1 | 1/1981 |
| EP | 0068367 B1 | 1/1983 |
| EP | 0087879 B1 | 9/1983 |
| EP | 0354 082 A1 | 2/1990 |
| EP | 0369798 B1 | 5/1990 |
| EP | 0479 522 B1 | 4/1992 |
| EP | 0 512 673 B1 | 11/1992 |
| EP | 1 794 402 B1 | 6/2007 |
| EP | 1816017 A1 | 8/2007 |
| EP | 2 142 394 | 1/2010 |
| FR | 2 604 660 A1 | 4/1988 |
| FR | 2747345 A1 | 10/1997 |
| FR | 3021254 A1 | 11/2015 |
| GB | 1536909 | 12/1978 |
| GB | 2 316 431 A | 2/1998 |
| JP | 59-199319 | 11/1984 |
| JP | S59206220 A | 11/1984 |
| JP | 61-169317 | 7/1986 |
| JP | 63-15218 | 2/1988 |
| JP | 10-61308 | 3/1998 |
| JP | 2000-38875 A | 2/2000 |
| JP | 2004036211 A | 2/2004 |
| JP | 2008-149849 A | 7/2008 |
| JP | 2014-234040 | 12/2014 |
| JP | 2016-048017 A | 4/2016 |
| WO | WO 2008/055982 A1 | 5/2008 |
| WO | WO 2014/191812 A1 | 12/2014 |

OTHER PUBLICATIONS

Japanese Notification of Reasons for Rejection dated Jul. 2, 2019 issued in corresponding JP Application No. 2018-524470, 5 pages, with English translation, 4 pages.
Japanese Notification of Reasons for Rejection dated Jul. 30, 2019 issued in corresponding JP Application No. 2018-536864, 5 pages, with English translation, 4 pages.
Japanese Notification of Reasons for Rejection dated Oct. 15, 2019 issued in corresponding JP Application No. 2018-557198, 7 pages, with English translation, 6 pages.
CN First Office action dated May 8, 2019 issued in Chinese corresponding Application No. 201780007613, 10 pages, with English translation, 5 pages.

* cited by examiner

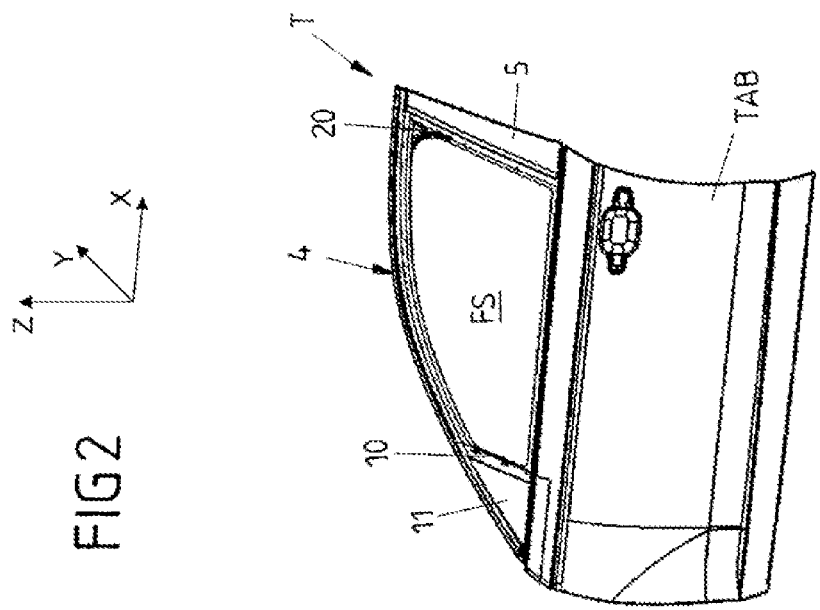
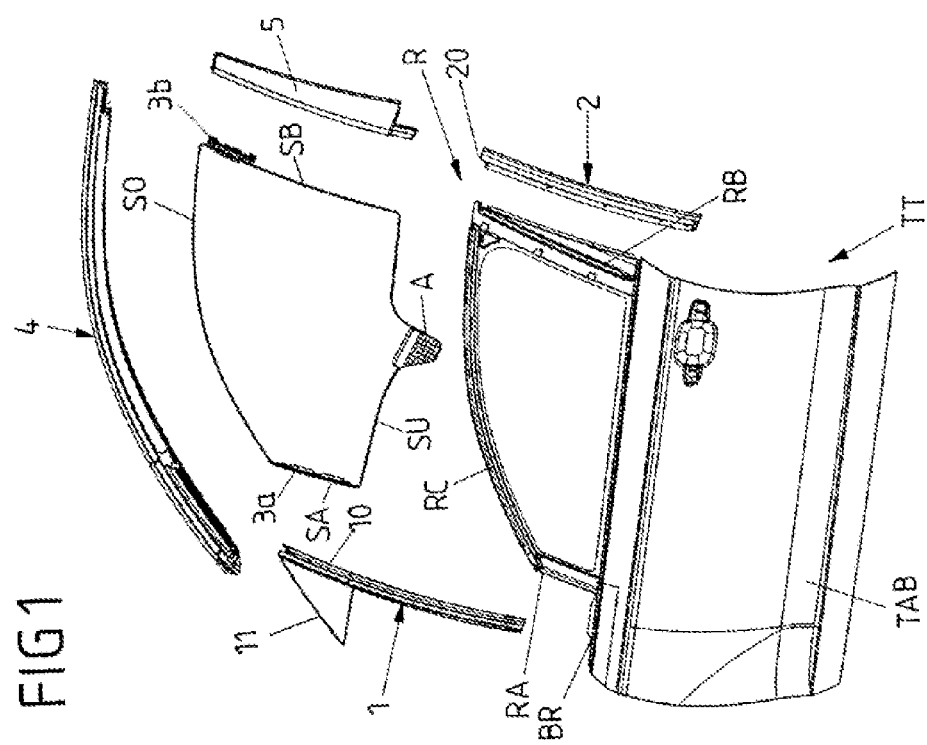

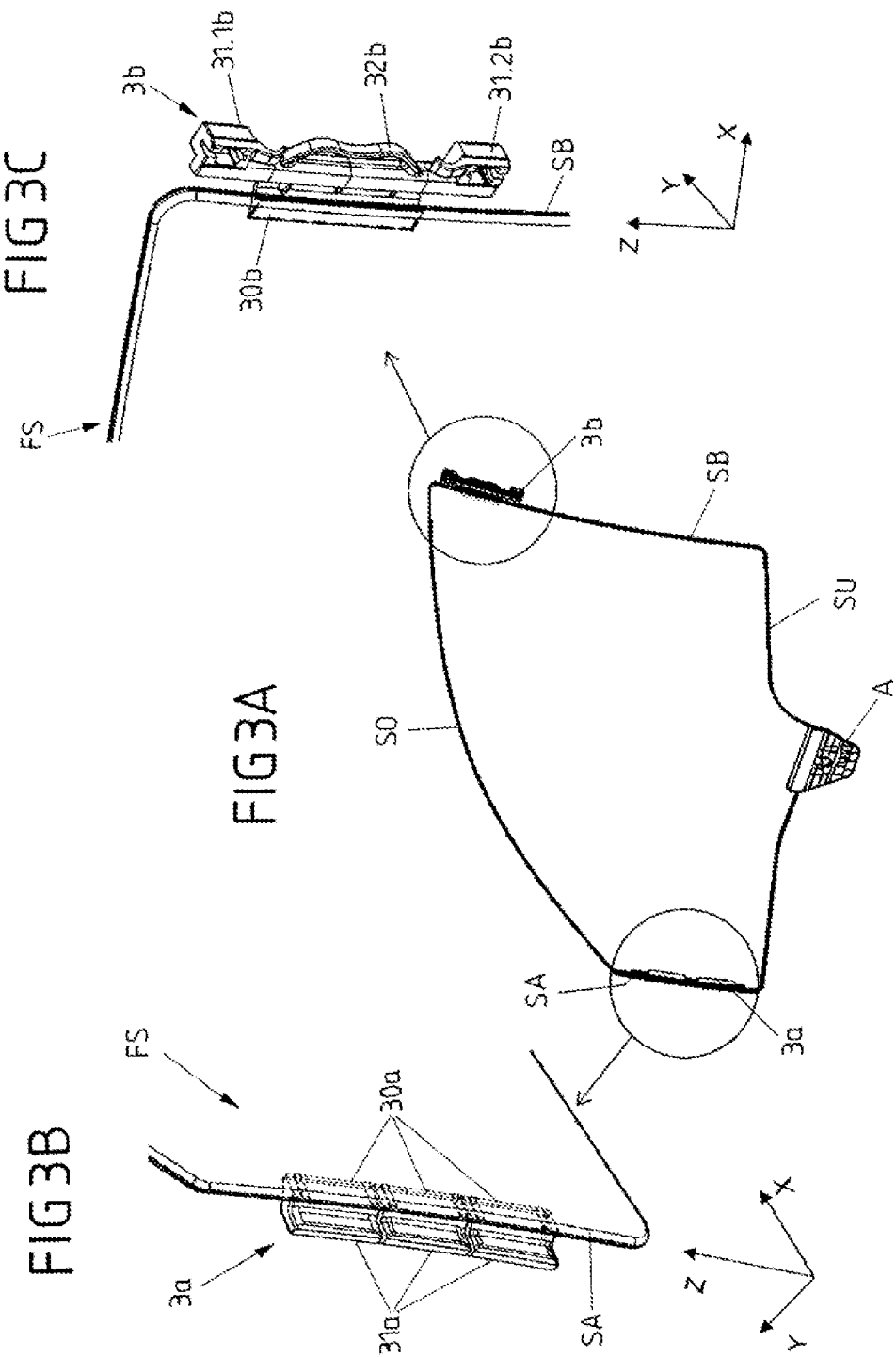

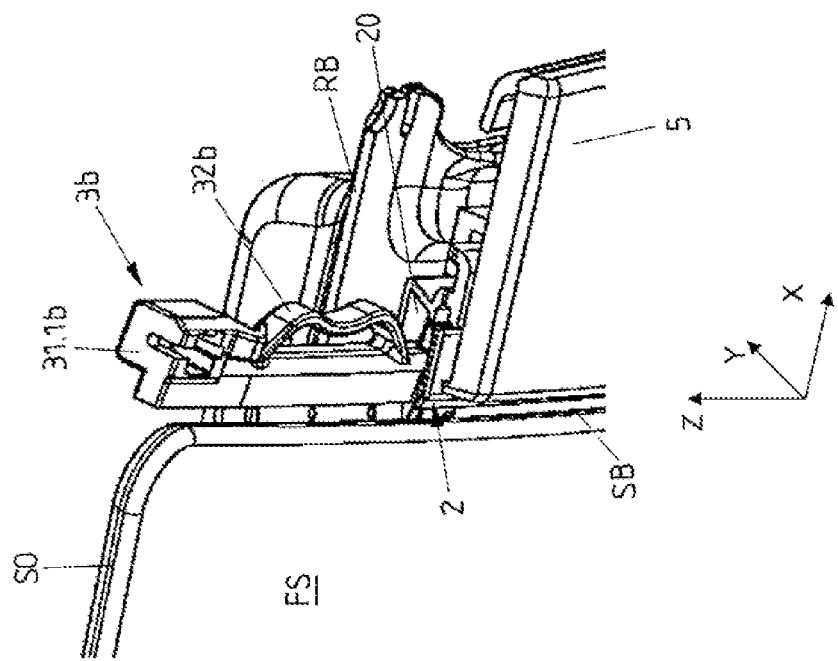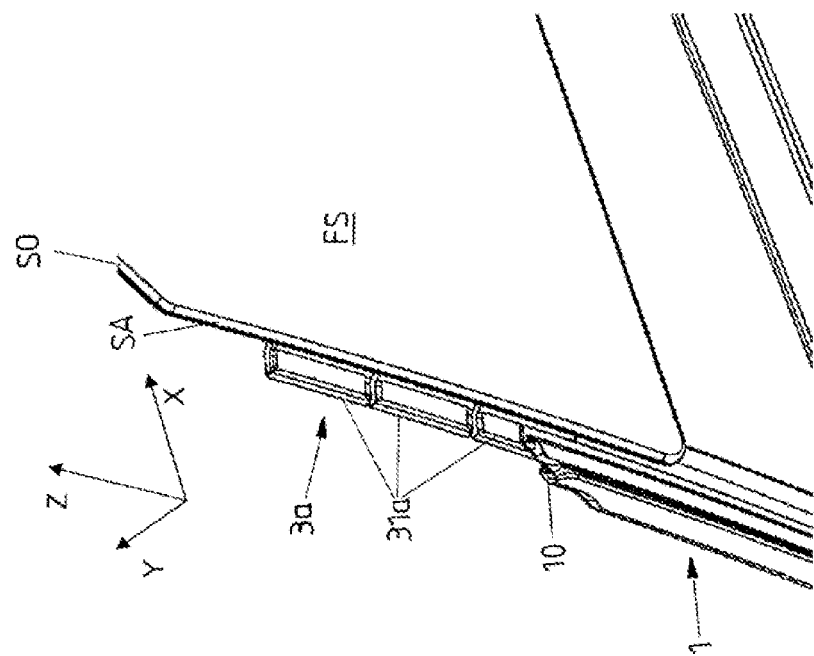

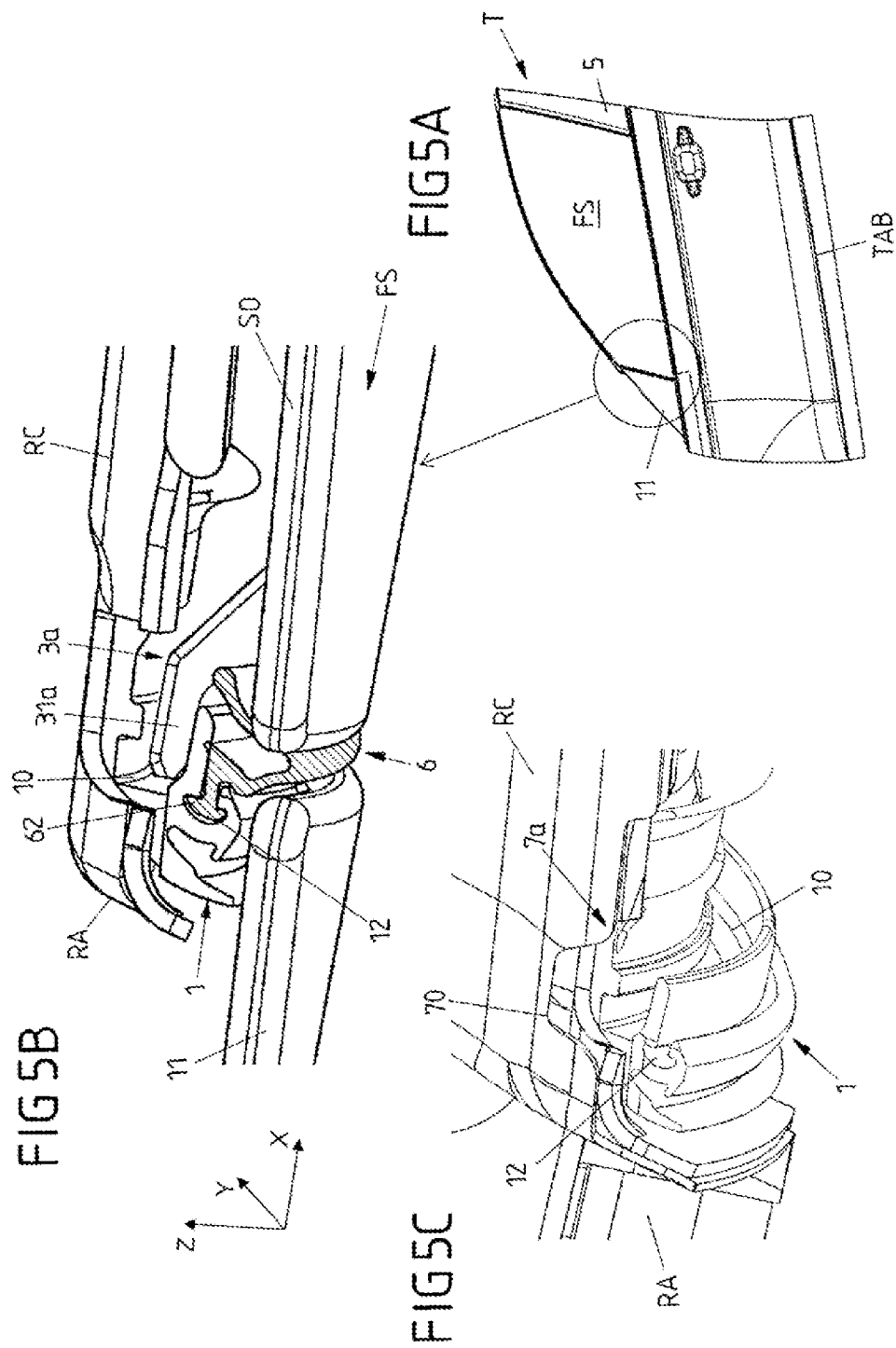

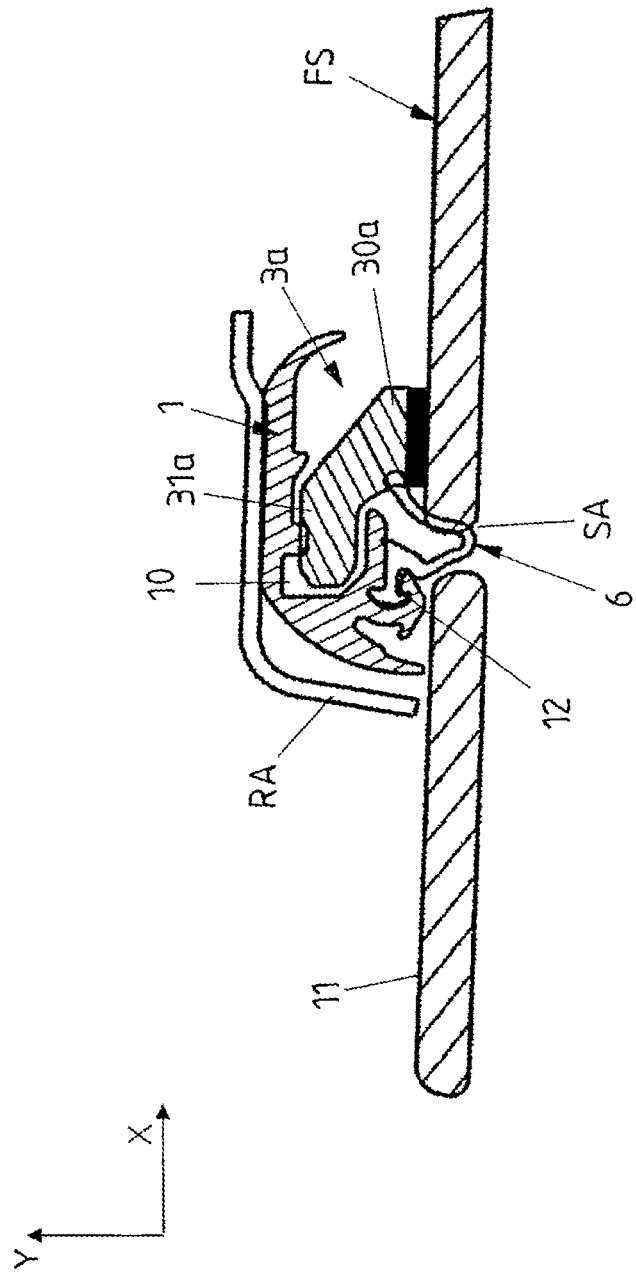

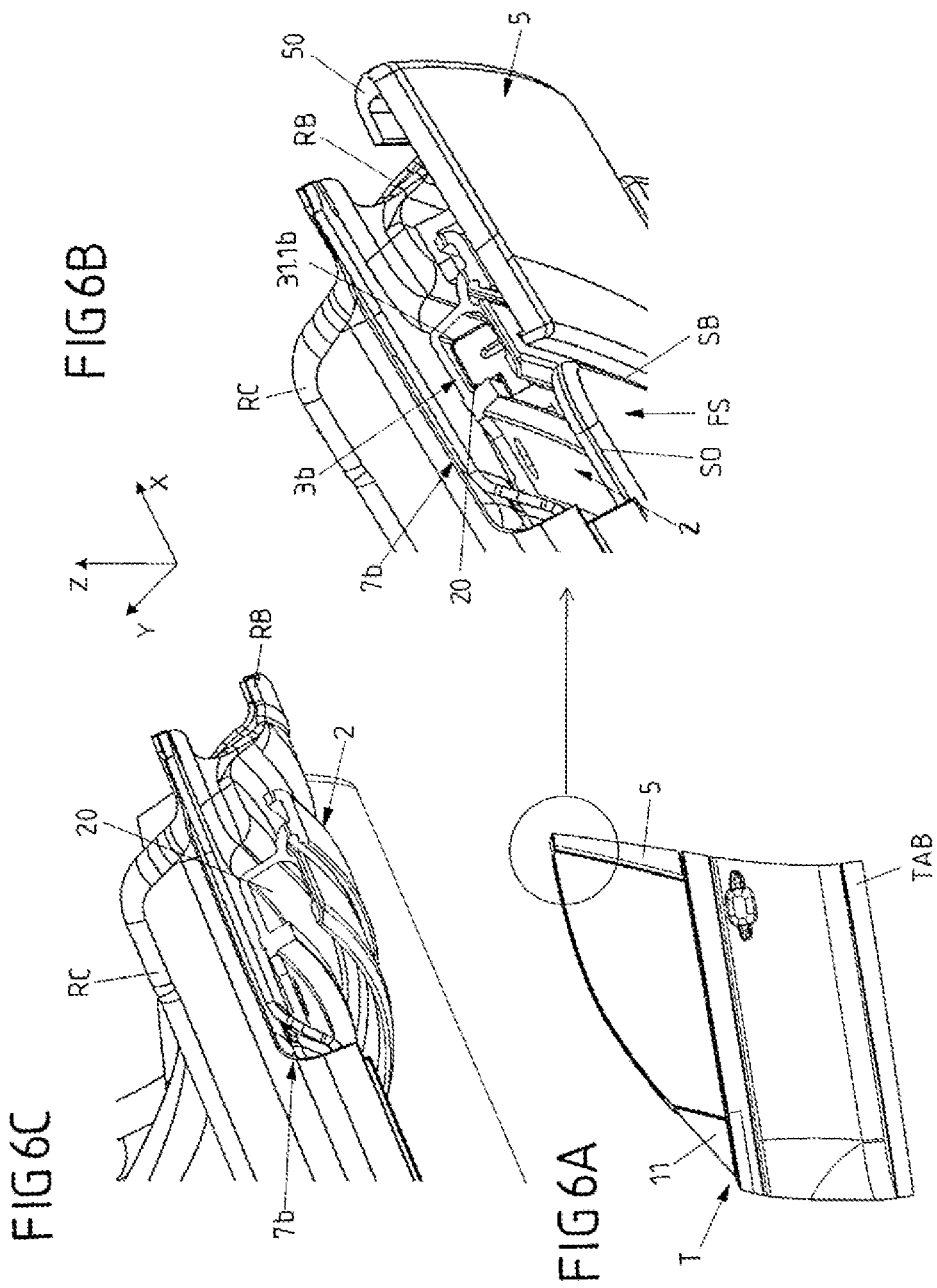

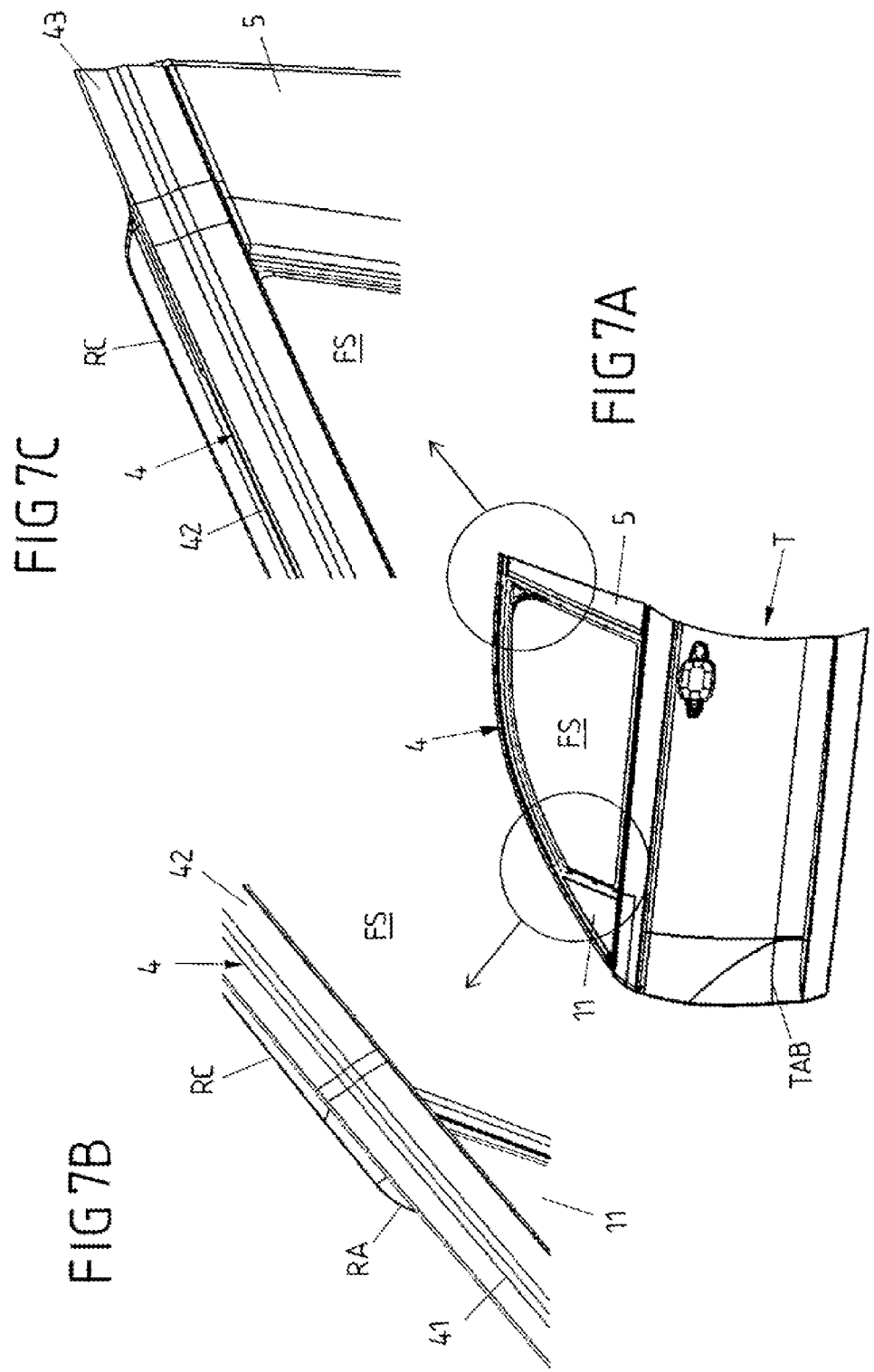

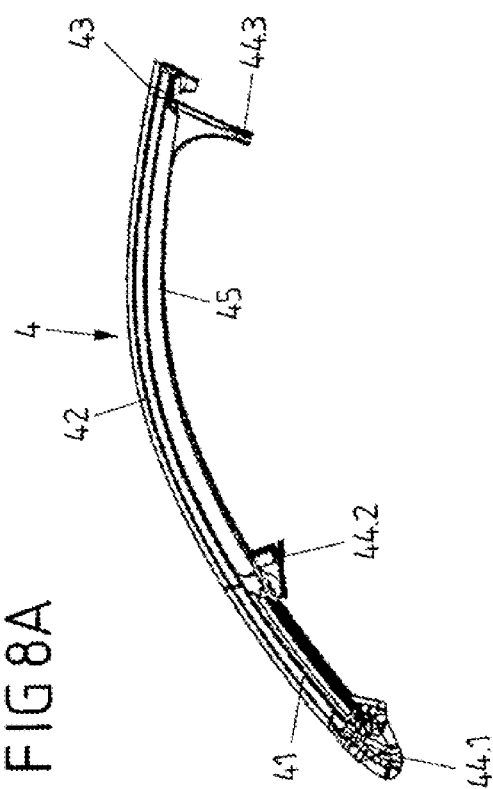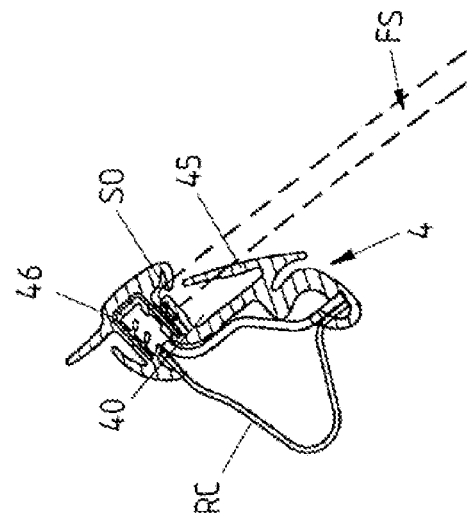

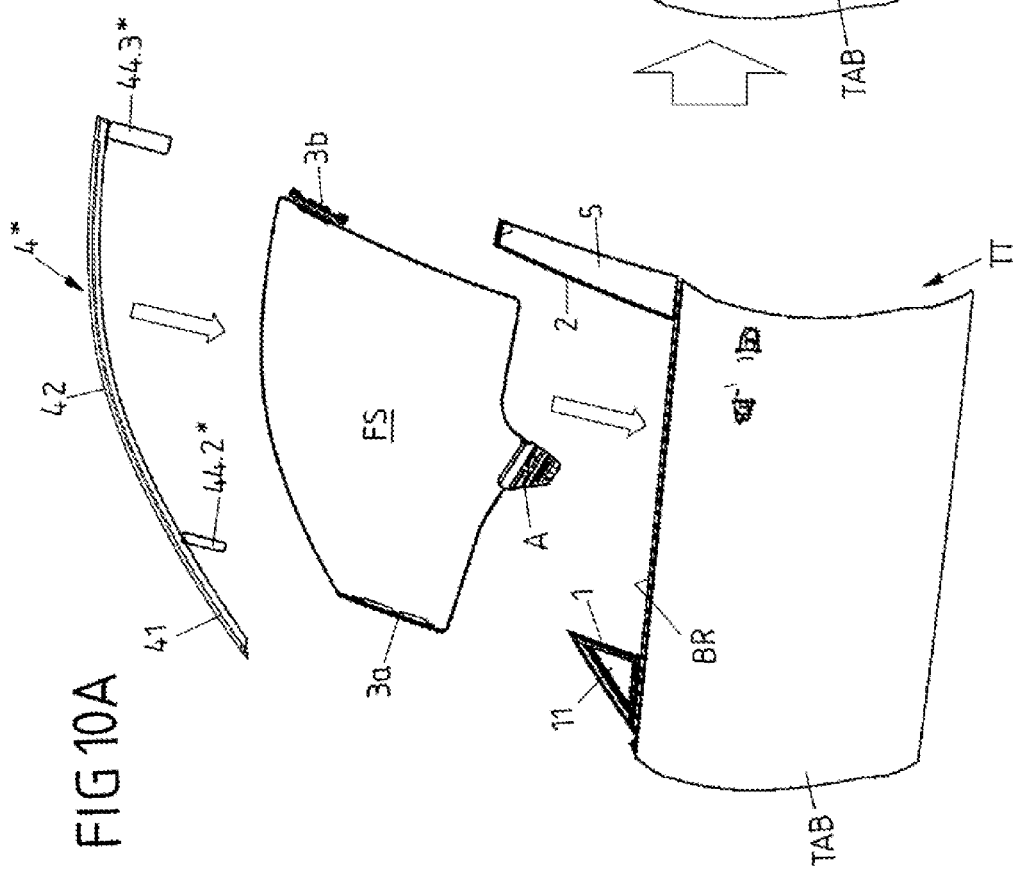

VEHICLE-DOOR ASSEMBLY WITH INSERTION REGIONS ON FRAME-SIDE GUIDE ELEMENTS AND MOUNTING METHOD

CROSS-REFERENCE TO A RELATED APPLICATION

This application is a National Phase Patent Application of International Patent Application Number PCT/EP2017/050363, filed on Jan. 10, 2017, which claims priority of and benefit to German Patent Application Number 10 2016 200 475.1, filed on Jan. 15, 2016, the contents of all of which are incorporated herein by reference.

BACKGROUND

The invention relates to a vehicle-door assembly and to a method for mounting a vehicle-door assembly.

Vehicle-door assemblies having a window pane that is adjustable along an adjustment path and extends along a (possibly curved) pane plane are widely known for vehicle window lifters. Here, a window opening within a vehicle door is closed via the window pane in a closed state. In recent years, flush-mounted pane concepts known as "flush glass" or "flush glazing" have become very popular at least in luxury-class vehicles. In this case, the window pane, in its closed position, is flush with upper and/or lateral body parts which bound a window opening to be closed by the window pane. Thus, when viewed from the outside, the window pane is not set back with respect to the body parts surrounding it when it is completely closed. Rather, the impression of a continuous, planar pane and body surface is created on the vehicle side. By way of example, such a flush glass concept is described in DE 35 00 791 A1, DE 10 2012 214 508 A1 or FR 2 604 660 A1. Recently, a flush glass concept was implemented for example in the Porsche Panamera.

In order to guide the window pane, in such glass concepts, a guide element is fixed to a front and rear lateral periphery of the window pane. Such a guide element is then guided in a displaceable manner in each case along the adjustment path on a different, vehicle-body-side or door-side guide element, which is usually in the form of a guide profile. The pane-side guide elements fixed to the window pane are commonly referred to here as "pin guides". However, it has hitherto been relatively complicated to mount such a window pane. Thus, the pane regularly has to be introduced from beneath into a guide channel in a vehicle-body-side or door-side guide element in the form of a guide profile, that is to say, for example, from beneath a window sill of a vehicle door. Such mounting then also requires a special door design, however, in which either a door outer skin has to be subsequently mounted on a door case, or a door frame module that is able to be mounted complete and consists of a door support, window frame and pane mounted thereon is provided and subsequently connected to the remaining components of the vehicle door, in particular a door inner skin and a door outer skin.

SUMMARY

Therefore, it is an object of the invention to provide a vehicle-door assembly which allows easier mounting in vehicle window lifters for a flush glass or flush glazing concept.

This object is achieved both by a vehicle-door assembly with features as described herein and by a mounting method with features as described herein.

According to the invention, a vehicle-door assembly is provided, which comprises at least the following:
- a window pane that is adjustable by a vehicle window lifter, in which the window pane, in a closed state, is flush with upper and/or lateral body parts that bound a window opening, to be closed by the window pane, of a vehicle door,
- a door-frame support which defines a door case beneath the window opening, the window pane being lowered into said door case in order to be opened, and which has at least two lateral frame parts that are located opposite one another above the door case at the window opening,
- a first frame-side guide element for laterally guiding the window pane at one of the lateral frame parts, and a second frame-side guide element for laterally guiding the window pane at the other of the lateral frame parts, and
- and two pane-side guide elements via which the window pane is held in a displaceable manner on the frame-side guide elements.

Here, the first and second frame-side guide elements each have, above the door case, an insertion region via which a pane-side guide element is positionable from above on the respective associated first or second frame-side guide element in order to mount the window pane on the door-frame support. Positioning "from above" is understood here to mean that the first and second pane-side guide elements, which are preferably already fixed to the window pane to be mounted, are positioned from above the door case and substantially along the subsequent adjustment path of the window pane in the direction of the door case, such that frame- and pane-side guide elements are held against one another and the pane-side guide elements are displaced downward (in the direction of the door case) on the frame-side guide elements.

Furthermore, at least one closure part is provided according to the invention, which is intended to be fitted in order to close at least one of the insertion regions of the first and second frame-side guide elements after the pane-side first and second guide elements have been positioned thereon. In one embodiment variant, provision is accordingly made for the insertion regions to be closed via a single closure part or at least two separate closure parts—preferably likewise by positioning the closure part or closure parts from above—after pane-side guide elements, which are preferably already fixed to the window pane, have been positioned from above on the frame-side guide elements such that the pane-side guide elements are held in a displaceable manner on the frame-side guide elements, and after the pane-side guide elements (and thus preferably the window pane connected thereto) have been displaced downward along the frame-side guide elements into a partially or completely open position of the window pane.

Thus, in principle, when a vehicle-door assembly equipped according to the invention is used in a vehicle door, it is no longer necessary to have a door design in which a door outer skin is mountable subsequently, i.e. in particular after the insertion of the window pane. Rather, the door outer skin can already be provided on the door-frame support in order to form a part of the door case or be formed by this door-frame support, before the window pane is mounted on the door-frame support. In this case, the door inner skin and door outer skin already define the cavity in the door case of the vehicle door, into which the properly mounted window pane is lowerable in order to be opened.

Usually, at least one frame-side guide element has a guide channel into which the associated pane-side guide element is introduced. Of course, a reverse solution can also be provided, for example with a strip, protruding from the frame, of the frame-side guide element and a cross-sectionally U-shaped pane-side guide element, which engages around the associated frame-side guide element and is held in a displaceable manner thereon in this way. A pane-side guide element is preferably fixed in a region close to a lateral pane edge of the window pane, for example by means of adhesive bonding. If the at least two first and second pane-side guide elements are already fixed in the region of the pane edges, with a vehicle-door assembly configured according to the invention, the window pane is mountable without problems from above via the insertion regions provided on the frame-side guide elements. In this way, the window pane is already held in a displaceable manner on the door-frame support before an insertion region or a plurality of (at least two) insertion regions is/are closed via the at least one closure part.

At least one frame-side guide element can be formed by a lateral frame part itself and be shaped for example thereon. This includes in particular a situation in which a guide channel is formed on a lateral frame part of the door-frame support, above the door case.

Alternatively or additionally, at least one frame-side guide element can be formed by a separate component that is fixed to a lateral frame part. Thus, it is possible for example for a separate guide rail to be fixed to a lateral frame part of the door-frame support in order to provide a lateral guide for the window pane above the door case. This, of course, does not rule out a situation in which a lateral frame part or a guide element, fitted separately thereon, for guiding the window pane also extends into the door case.

In one embodiment variant, both an insertion region of the first frame-side guide element and an insertion region of the second frame-side guide element are closed via a properly fitted closure part. Via the fitting of a single closure part, it is thus possible for both insertion regions to be closed properly. For this purpose, the closure part is formed for example in an elongate manner and, in a properly fitted state, bridges a distance between the two insertion regions, which are provided on the opposite frame-side guide elements.

In one embodiment variant, an insertion region of at least one frame-side guide element is formed by a profiled upwardly open end region of the frame-side guide element. In such a way, for example, a guide channel, formed by the guide element, for a pane-side guide element is accessible from above such that, when a closure part has not yet been fitted, the frame-side guide element can be introduced thereat. With the at least one closure part, this open end region is then closed and/or covered, such that a pane-side guide element can no longer be pushed out, after the assembly of the vehicle door, via the end region that is open during the assembly of the vehicle-door assembly and be separated from the associated frame-side guide element. Thus, via the closure part, the displaceable mounting of at least one pane-side guide element on an associated frame-side guide element is ensured, such that a pane-side guide element cannot (can no longer) be pushed out upward and be separated from the pane-side guide element after the closure part has been fitted.

In order to form a usually U-shaped window frame above the door case and thus above a window sill of the vehicle door, an upper frame part is provided, which connects the first and second lateral frame parts above the door case together. Such an upper frame part is usually present in the region of a roof of the vehicle with the vehicle door closed.

In one variant, the at least one closure part is intended to be fitted in the region of the upper frame part in order to close the at least one insertion region of a frame-side guide element in this way.

In particular, the upper frame part can in this case form, in the insertion region of at least one frame-side guide element, a portion that is set back with respect to an adjoining portion of the upper frame part and/or with respect to an adjoining portion of a lateral frame part, and specifically substantially perpendicularly and/or parallel to a pane plane along which the mounted window pane extends in the closed state. With regard to a closed state of a vehicle door formed with the vehicle-door assembly, a portion is thus provided, for example, which is set back in the direction of a vehicle interior with respect to at least one adjoining portion of a window frame, in order to make it easier to position a pane-side guide element from above on an associated frame-side guide element or even to make this possible in the first place. Thus, it is possible, via a set-back portion of the upper frame part, to make an insertion region of the respective guide element accessible from above, in order for it to be possible to apply the window pane, already connected to the pane-side guide elements, from above onto the frame-side guide elements without the window pane tilting or being skewed into the door-frame support.

The at least locally set-back frame part of a door-side window frame allows the window pane also to be able to terminate flush with an upper body part with its pane upper edge, in order to achieve an esthetically particularly appealing overall impression. The set-back portion, embodied for example as a cutout or notch, of the upper frame part is then closed, preferably in a sealing manner, via the closure part.

The set-back portion can extend at the upper frame part—preferably along the periphery of the window opening—along a length that is greater than half the distance between the first and second lateral frame parts. A length of the upper frame part is in this case measured in a direction of extension from one of the lateral frame parts to the other frame part. In this variant, the upper frame part is thus set back not just locally and thus not just along a fraction of an overall length of the upper frame part, but rather along the majority of the upper frame part. In this way, easier mounting of the window pane and easier passing of the window pane past the upper frame part during mounting can be provided.

Instead of fitting the at least one closure part in the region of an upper frame part, the at least one closure part can form at least a part of the upper frame part. The closure part fitted subsequently, i.e. after the mounting of the window pane on the lateral frame parts of the door-frame support, thus forms a reinforcing part of the window frame of the vehicle door. For this purpose, regions of the two lateral frame parts located opposite one another are connected together via the closure part and a window frame of the vehicle door is completed by the closure part.

Regardless of whether the at least one closure part is fitted on an upper frame part or itself forms a part of such an upper frame part of the window frame, the closure part can have at least one portion that protrudes in the direction of the door case in the properly fitted state of the closure part. Via the at least one protruding portion, it is possible, with the closure part fitted properly, for an insertion region to be closed and/or covered at least partially, possibly also completely, in particular in a sealing manner. Alternatively or additionally, the at least one protruding portion can be designed and provided to connect the closure part to one of the lateral frame parts. In the last-mentioned case, the protruding portion can comprise for example a gusset plate for the connection to a lateral frame part.

In the case of a protruding portion, provided on the closure part, for closing and/or covering an insertion region, the protruding portion is embodied, in one exemplary embodiment, as a molded part fitted on a support of the closure part. Such a molded part can for example be integrally formed, in particular vulcanized, on the support of the closure part. In this case, the molded part can also be formed from a different material than the support of the closure part, for example from a (different) material, in particular from a less stiff (plastics) material.

In one embodiment variant, provision is made for the closure part to have a seal for a pane upper edge of the window pane. Such a seal integrated into or at least fixed to the closure part thus serves, in the closed state of the window pane, to provide sealing of the window opening in the region of the pane upper edge. For example, such a seal is configured such that, in the closed state, the window pane bears in a sealing manner, in the region of its pane upper edge, with an inner side against a sealing lip of the seal, while at most a narrow sealing rim of the seal is provided on the outer side of the window pane in the region of the pane lower edge, in order not to impair the flush termination at the upper edge of the vehicle door.

For easier mounting, in one exemplary embodiment, the closure part can be pluggable onto at least one of the first and second lateral frame parts and/or onto an upper frame part that connects the first and second frame parts together. The closure part is plugged on in this case for example likewise from above. Optionally, a fitting direction of the closure part can also extend obliquely or transversely to a vertical axis of the vehicle door, however, such that the closure part is plugged onto an upper frame part for example from the front.

In one exemplary embodiment, the closure part has an elongate strip element, which, when the closure part is fitted properly on the door-frame support, forms an upper termination of the window opening, said termination being visible on the outer side of the vehicle door. The closure part thus remains visible with at least one side face at the assembled vehicle door and thus forms a decorative or trim part of the vehicle door.

The closure part can in principle be produced from plastic or metal and, as already explained above, comprise a seal fastened thereto or integrally formed, for example injection-molded thereon. The closure part can also be produced at least partially from a rubber material. In this case, the closure part does not take on any load-bearing function in the region of the window frame of the vehicle door. Rather, in the case of a closure part produced at least partially from a rubber material, in addition to a closure function for at least one insertion region of the frame-side guide elements, there is an emphasis on a sealing function in the region of the pane upper edge with the window pane closed.

In one embodiment variant, with a vehicle door installed properly in a vehicle, the first lateral frame part is arranged in the region of an A pillar of the vehicle and the second lateral frame part is arranged in the region of a B pillar of the vehicle. The vehicle-door assembly is thus part of a front driver's or passenger's door of the vehicle. Of course, the solution according to the invention is not limited thereto. For instance, a vehicle-door assembly configured according to the invention can also be provided for a rear vehicle door.

In one exemplary embodiment of the vehicle-door assembly for a driver's or passenger's door, the closure part extends above a mirror triangle, provided in the region of the A pillar, of the vehicle door. In this case, the closure part can thus extend along at least one edge of this mirror triangle. In particular in this embodiment variant, the closure part is embodied in an elongate manner and can extend—for example as a door-frame strip or as an upper frame part of the window frame—above the door case along the entire length of the vehicle door.

A further aspect of the invention is the provision of a mounting method with features as described herein.

Accordingly, a method is proposed for mounting a vehicle-door assembly that has an adjustable window pane for a vehicle window lifter, and a door-frame support, wherein the window pane, in a closed state, is flush with upper and/or lateral body parts that bound a window opening, to be closed by the window pane, of a vehicle door. The mounting method thus relates to vehicle-door assemblies for a flush-mounted pane concept known as "flush glass" or "flush glazing". The door-frame support furthermore defines a door case beneath the window opening, the window pane being lowered into said door case in order to be opened. Furthermore, the door-frame support has at least two lateral frame parts that are located opposite one another above the door case at the window opening. The method according to the invention in this case now comprises at least the following steps of:

providing the door-frame support having a first frame-side guide element for laterally guiding the window pane at one of the lateral frame parts, and a second frame-side guide element for laterally guiding the window pane at the other of the lateral frame parts, providing first and second pane-side guide elements via which the window pane is held in a displaceable manner on the frame-side guide elements, providing the first and second frame-side guide elements, each having an insertion region above the door case, and positioning the first and second pane-side guide elements from above on the first and second frame-side guide elements in the respective insertion region in order to mount the window pane on the door-frame support, and closing at least one of the insertion regions of the first and second frame-side guide elements by at least one closure part after the pane-side first and second guide elements have been positioned on the first and second frame-side guide elements.

A mounting method according to the invention can in this case be used in particular for mounting a vehicle-door assembly configured according to the invention. Consequently, the advantages and features specified above and below for embodiment variants of a vehicle-door assembly according to the invention also apply to embodiment variants of a mounting method according to the invention, and vice versa.

Preferably, the first and second pane-side guide elements are already fixed to the window pane when the first and second pane-side guide elements are positioned on the first and second frame-side guide elements. The pane-side guide elements are fixed to the window pane in this case at lateral pane edges of the window pane, for example by means of adhesive bonding.

In accordance with the above explanations, it is also possible, in one embodiment variant of a mounting method according to the invention, for an upper frame part for a window frame of the vehicle door to be provided, said upper frame part connecting the first and second lateral frame parts of the door-frame support above the door case together. In this case, the upper frame part can already form a part of the door-frame support before the window pane is mounted thereon. Alternatively, the closure part forms an upper frame part, which is connected to the lateral frame parts of the window frame only after the window pane has been mounted.

Thus, according to the first-mentioned variant, the upper frame part can form, in the insertion region of at least one frame-side guide element, a portion that is set back with respect to an adjoining portion of the upper frame part and/or with respect to an adjoining portion of a lateral frame part, and specifically substantially perpendicularly and/or parallel to a pane plane along which the mounted window pane extends in the closed state. In this case, the closure part is then preferably fitted on the upper frame part at least in the region of the set-back portion, in order to cover and/or close the set-back portion.

In the abovementioned second alternative, the at least one closure part can form at least a part of the upper frame part, and a part of a window frame that is defined by the door-frame support can be upwardly open for a window opening without the fitted closure part, in order to make the insertion of the window pane, with first and second pane-side guide elements fixed thereto, from above easier. The closure part is then fitted and connected to the first and second lateral frame parts after the window pane has been mounted, with the result that the window frame of the vehicle door is then completed, and so said window frame appears to be substantially U-shaped above the door case and therefore above a window sill.

During the mounting of the vehicle-door assembly, it is also possible for a cover to be fitted on at least one of the frame parts. For example, such a cover of the vehicle-door assembly is provided on a frame part close to the B pillar. A cover can in this case be mounted on the associated frame part before or after the window pane is mounted on the door-frame support.

BRIEF DESCRIPTION OF THE DRAWINGS

Possible embodiment variants of the solution according to the invention are also illustrated by the appended figures.

FIG. 1 shows an exploded illustration of one embodiment variant of a vehicle-door assembly according to the invention.

FIG. 2 shows a side view of a vehicle door formed with the vehicle-door assembly.

FIG. 3A shows a side view of a window pane of the vehicle-door assembly with pane-side guide elements fixed thereto.

FIGS. 3B-3C show enlarged details of the window pane in FIGS. 3A and 3B, in each case looking at a pane-side guide element.

FIGS. 4A-4B show details of the window pane during mounting on frame-side guide elements of a door-frame support of the vehicle-door assembly, with the pane-side guide elements being positioned on the frame-side guide elements.

FIG. 5A shows a side view of the vehicle door in FIG. 2 with a region close to the A pillar being highlighted.

FIGS. 5B-5D show different views of details of the design of the window frame and of the frame-side and pane-side guide elements in the region of the vehicle door close to the A pillar.

FIG. 6A shows a side view of the vehicle door in FIG. 2 with a region close to the B pillar being highlighted.

FIGS. 6B to 6D show different views of details of the window frame of the vehicle door and of the frame-side and pane-side guide elements in the region close to the B pillar.

FIG. 7A shows a side view of the vehicle door in FIG. 2 with regions of an upper frame part of a window frame of the vehicle door that are close to the A pillar and close to the B pillar being highlighted.

FIGS. 7B-7C show the upper frame part of the window frame in the region of the vehicle door close to the A pillar and close to the B pillar on an enlarged scale and in a perspective view.

FIG. 8A shows a perspective individual illustration of a closure part of the vehicle-door assembly for fitting on an upper frame part of the window frame of the door-frame support, with molded parts integrally formed thereon.

FIG. 8B shows an alternative embodiment variant of the closure part in FIG. 8A without molded parts integrally formed thereon.

FIG. 9 shows a sectional illustration of the closure part in FIG. 8A or 8B in a state fitted properly on an upper frame part.

FIG. 10A shows an exploded illustration of a further embodiment variant of a vehicle-door assembly according to the invention with a closure part that forms an upper frame part of the window frame of the vehicle door.

FIG. 10B shows a side view of a vehicle door, formed from the vehicle-door assembly in FIG. 10A, in the assembled state.

DETAILED DESCRIPTION

Figure 6D:
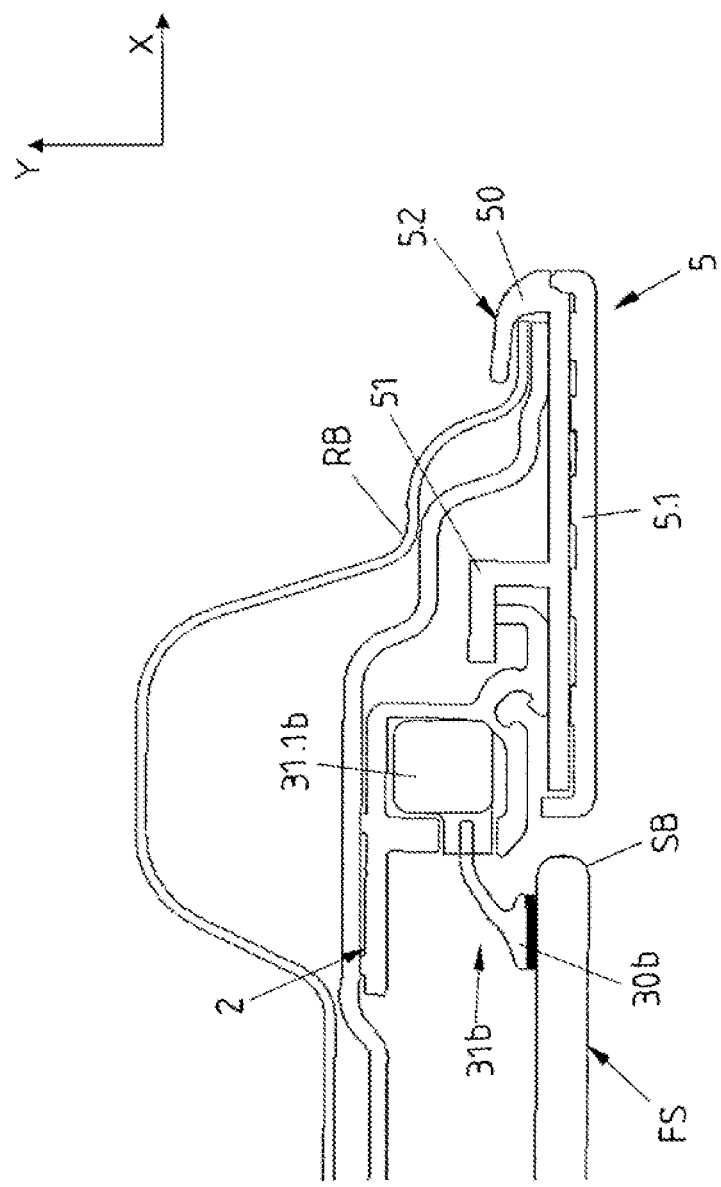

FIG. 1 shows an exploded illustration of one embodiment variant of a vehicle-door assembly according to the invention. This vehicle-door assembly comprises, inter alia, a door-frame support TT having a door outer skin in the form of a door outer panel TAB for defining a door case. The door-frame support TT has a two-shell structure, i.e. the door outer panel TAB is connected to a door inner skin in the form of a door inner panel, forming the door case. In this case, a cavity is defined via the door-frame support TT a cavity in the vehicle door, it being possible for a window pane FS to be lowered into said cavity in order to be opened.

Above a sill region BR, the door-frame support TT forms a window frame R for this window pane FS. The window frame R in this case has two lateral frame parts RA and RB that are located opposite one another at a window opening O defined by the window frame R, and an upper frame part RC that connects the two lateral frame parts RA and RB above the sill region BR together. The upper frame part RC is usually also referred to as the upper part of the door frame of the vehicle door T.

The window opening O defined by the window frame R is intended, in the assembled state of a vehicle door T, to be able to be closed by the displaceably guided window pane FS. The window pane FS can in this case be lowered in order to be lowered into the door case of the door-frame support TT, and specifically into the formed cavity of the vehicle door T. In order in this case to lift and lower the window pane FS along an adjustment path manually or in a manner actuated by external power, a vehicle window lifter (not illustrated in more detail here) is provided and accommodated within the door case. In this case, a drive means of the vehicle window lifter, for example a flexible traction means in the form of a cable pull, acts on a driver element which is connected to a pane adapter A of the window pane FS. The pane adapter A is, for this purpose, fixed to a protrusion on a pane lower edge SU of the window pane FS and transmits an adjusting force of the driver connected to the pane adapter to the window pane FS, in order to lift or lower the latter.

The window pane FS is in the present case part of a flush-mounted pane concept in which the window pane FS, in a closed state, is flush with upper and/or lateral body parts of the vehicle which bound the window opening O, to be closed by the window pane FS, of the vehicle door T. In this case, a surface of upper and/or lateral body parts adjoins the respective periphery of the window pane FS such that the respective surface adjoins the pane plane defined by the window pane FS in a flush manner. As a result, the impression of a continuous pane and body surface is created. The closed window pane FS is in this case thus not set back with respect to lateral and upper body parts. Usually, the expressions "flush glass" or "flush glazing" are also used in this connection.

In order, in such a flush-mounted pane concept, to guide the window pane FS in a displaceable manner above the door case and thus above the sill region BR and to keep it on the window frame R, pane-side guide elements 3a and 3b in the form of what are known as "pin guides" are fixed to the window pane FS in the region of opposite lateral pane edges SA and SB. These pane-side guide elements 3a and 3b are guided in each case in a displaceable manner in lateral guide elements 1 and 2 of the window frame R.

The lateral guide elements are in this case embodied as guide strips 1 and 2, which are each fixed as separate components to an associated lateral frame part RA or RB. The vehicle door T to be formed by the illustrated vehicle-door assembly is a driver's door of a vehicle. Accordingly, a first (front) lateral frame part RA is provided in the region of the A pillar in the properly installed state of the vehicle door T. The second (rear) frame part RB, located opposite this first lateral frame part RA at the window opening O, is thus present in the region of a B pillar when the vehicle door T has been installed properly.

The guide strips 1 and 2 fitted on these frame parts RA, RB each form a guide channel 10 or 20 for the lateral pane-side guide elements 3a or 3b of the window pane FS. In this case, the guide strips 1 and 2 each also extend into the interior of the door case of the door-frame support TT, in order in this way to provide a guide for the window pane FS within the door case, too.

In the case of previously known vehicle-door assemblies for a flush-mounted pane concept having a window pane FS guided in the region of its lateral pane edges SA and SB, the window pane FS is usually fitted from beneath the sill region BR, i.e. in the region of the door case. In this case, the pane-side guide elements 3a and 3b, already fixed to the window pane FS, for example by means of adhesive bonding, are threaded from beneath into a respectively associated guide channel 10 or 20 of a guide strip 1 or 2 and the window pane FS is then displaced upward in the direction of a closed position. For this purpose, the door outer panel TAB is then able to be mounted only subsequently on the door-frame support TT. The door outer panel TAB can thus not already be present on the door-frame support TT before the window pane FS is mounted on the latter, as is usual in conventional door designs for non-flush-mounted pane concepts. Rather, a special construction of the vehicle door T and of the door-frame support TT is necessary.

With the embodiment variant illustrated in FIG. 1 of a vehicle-door assembly according to the invention, by contrast, mounting of the window pane, with pane-side lateral guide elements 3a and 3b already fixed thereto, from above on the door-frame support TT having the door outer skin TAB is possible. In this case, the associated guide strips 1 and 2 have also already been fixed to the lateral frame parts RA and RB before the window pane FS is introduced thereat. Both lateral guide strips 1 and 2 have, for this purpose, in the region of the upper frame part RC, an insertion region via which the pane-side guide elements 3a and 3b can be introduced into the respective guide channel 10 or 20 of a guide strip 1 or 2 from above. In the simplest case, for this purpose, a guide strip 1 or 2 embodied as an elongate profile is open toward its upper end, such that the respective guide channel 10 or 20 is accessible from above in order to introduce a pane-side guide elements 3a or 3b from above. Alternatively, in the region of one end of the respective guide strip 1 or 2, a cutout is provided, via which a pane-side guide element 3a or 3b can be threaded into the respective guide channel 10 or 20 from above.

In order to allow the pane-side guide elements 3a and 3b to be positioned on the associated frame-side guide elements 1 and 2 and the respective guide channel 10 or 20 thereof via the upper frame part RC of the window frame R, the upper frame part RC has in each case an at least locally set-back portion in the insertion region of one frame-side guide element 1 or 2—and thus, in the present case, in the respective end of the guide element 1 or 2. The portion is in this case set back inwardly substantially perpendicularly to the pane plane of the window pane FS, such that the window pane FS is guided, with the pane-side guide elements 3a and 3b protruding laterally and inwardly thereon, past the upper frame part RC and the pane-side guide elements 3a and 3b can be introduced, past the upper frame part RC, into the respectively associated guide channel 10 or 20 from above.

In order, after the window pane FS has been mounted on the door-frame support TT, to close the insertion regions provided by the guide strips 1 and 2 with the aid of the upper frame part RC and, in a closed state of the window pane FS, to allow the window frame R to terminate in a flush manner with the window pane FS even upwardly, a closure part in the form of a door-frame strip 4 is provided. This door-frame strip 4 is formed in an elongate manner. It forms a strip that terminates the vehicle-door body upwardly, said strip extending not only along a pane upper edge SO of the closed window pane FS but in particular also along a mirror triangle 11 provided on the first, front guide strip 1. In this case, the door-frame strip 4 extends as far as a front end of the sill region BR. The door-frame strip 4 is plugged onto the window frame R of the door-frame support TT—likewise from above—and fixed to the upper frame part RC.

Before the door-frame strip 4 is fitted and, if appropriate, already before the window pane FS is fitted on the door-frame support TT, a cover element 5 should also be fixed to the second, rear frame part RB and/or the guide strip 2 thereof in the present case. Via this cover element 5, a termination of the vehicle door T that is flush with the closed window pane FS is produced toward the outer side of the body in the region of the B pillar. This is apparent in particular from FIG. 2, which shows the assembled vehicle door T in side view.

FIGS. 3A to 3C, 4A to 4B, 5A to 5D, 6A to 6D, 7A to 7C, 8A to 8B and 9 show further details of the above-described embodiment variant of a vehicle-door assembly according to the invention.

FIGS. 3A, 3B and 3C in this case first of all depict the window pane FS with the pane-side guide elements 3a and 3b fixed thereto and the pane adapter A of the latter. FIGS. 3B and 3C each illustrate a pane-side guide element 3a or 3b on an enlarged scale.

A (front) guide element 3a fixed to the lateral pane edge SA close to the A pillar by means of adhesive bonding serves in this case to guide the window pane FS exclusively in the Y direction transversely to the pane plane of the window pane FS. In this case, the front pane-side guide element 3a has a base 30a, via which the front pane-side guide element 3a is firmly bonded on the inside to the window pane FS close to the front lateral pane edge SA. From this base 30a there extend a plurality of guide portions 31a that protrude in an L-shaped manner from the inner side of the window pane FS. Each of these L-shaped guide portions 31a has in this case a region which protrudes beyond the front lateral pane edge SA and via which the front pane-side guide element 3a can engage in the guide channel 10 of the guide strip 1 and can be guided in a displaceable manner on the first guide strip 1 via said guide channel 10.

On the opposite (rear) lateral pane edge SB of the window pane FS, the at least one other (rear) second guide element 3b is adhesively bonded to the inner side of the window pane FS. For this purpose, the rear pane-side guide element 3b also has a base 30b. From the base 30b, adhesively bonded to the inner side of the window pane FS, a portion of the second pane-side guide element 3b extends via the rear lateral pane edge SB, such that the second, rear pane-side guide element 3b protrudes beyond the rear lateral pane edge SB of the window pane FS. The protruding part of the rear pane-side guide element 3b in this case forms two, in the present case cuboidal, guide portions 31.1b and 31.2b, which can be introduced into the guide channel 20 of the second guide strip 2 and be held in a displaceable manner therein. The guide portions 31.1b and 31.2b are in this case located one above the other with regard to a direction of longitudinal extent of the rear guide strip 2. Via the guide portions 31.1b and 31.2b received in a form-fitting manner in the guide channel 20, physical guidance of the second, rear pane-side guide element 3b and thus of the window pane FS on the second guide strip 2 both in the Y direction (i.e. transversely to the pane plane) and in the X direction (i.e. parallel to the pane plane and substantially perpendicularly to the adjustment direction of the window pane FS) is provided.

Between the two guide portions 31.1b and 31.2b, the second, rear pane-side guide element 3b also forms a spring portion 32b. Via the latter, the second, rear pane-side guide element 3b is supported in a resilient manner in the X direction extending substantially parallel to a vehicle longitudinal direction with the vehicle door T fitted properly on a vehicle. By way of a resilient abutment of the second, rear pane-side guide element 3b against the associated second guide strip 2 in the X direction, compensation for play is provided. The resilient abutment also serves as rattle protection and thus to avoid undesired rattling noises with the window pane FS mounted properly on the door-frame support TT.

The detail illustrations in FIGS. 4A and 4B each depict, in a perspective manner, looking at the upper insertion regions of the guide strips 1 and 2, the positioning of the front and rear pane-side guide elements 3a and 3b, already fixed to the window pane FS, in the respectively associated guide strip 1 or 2. The figures also show how the window frame R is set back, with its two lateral frame parts RA and RB and the upper frame part RC connecting the latter, at the respective upper, open end of a guide strip 1 or 2, in order for it to be possible to thread the pane-side guide elements 3a and 3b from above into the guide channels 10 and 20 of the guide strips 1 and 2. In this case, FIG. 4B furthermore depicts that, in the present case, the cover element 5 has already been fixed to the rear frame part RB before the window pane FS is mounted on the door-frame support TT.

FIGS. 5A to 5D depict different views, in some cases on a further enlarged scale, of the region, close to the A pillar, of the window frame R of the door-frame support TT with the already mounted window pane FS. In this case, a set-back portion 7a of the upper frame part RC is apparent in particular from FIG. 5C, said set-back portion 7a allowing the first, front pane-side guide element 3a to be guided past the upper frame part RC and to be threaded into the upwardly open guide channel 10 of the guide strip 1. This set-back portion 7a has, in the present case, an additional, inwardly directed recess 70 in order for it to be possible to introduce the guide portions 31a, protruding from the inner side of the window pane FS, of the first, front pane-side guide element 3a into the guide channel 10 more easily.

It is also apparent from the views in FIGS. 5B to 5D that the front guide strip 1 also forms a fastening channel 12 for fixing a sealing element in the form of a gap seal 6. The gap seal 6 is in this case provided in a necessarily resulting, narrow gap between the mirror triangle 11 and the window pane FS and provides sealing in the region of the front lateral pane edge SA. In order to fix the gap seal 6, the latter has a fastening portion 62 that protrudes in a rib-like manner and is received in a form-fitting manner in the fastening channel 12 of the guide strip 1.

FIGS. 6A to 6D depict the insertion region at the second, rear guide strip 2 and an associated set-back portion 7b of the upper frame part RC in this insertion region. The set-back portion 7b of the upper frame part RC is in this case recessed inwardly in order to allow the second, rear pane-side guide element 3b to be guided past the upper frame part RC and to allow this pane-side guide element 3b to be threaded into the frame-side rear guide strip 2. The upwardly open insertion region of the second, rear guide strip 2 and the set-back (rear) portion 7b of the upper frame part RC are in this case closed by the subsequently fitted door-frame strip 4, just like the upwardly open end of the first, front guide strip 1 and the associated (front) set-back portion 7a of the upper frame part RC.

In particular the sectional illustration in FIG. 6D furthermore illustrates the fixing of the cover element 5 to the rear lateral frame part RB and the rear guide strip 2. In this case, the cover element 5 has a support part 5.2, which engages behind portions of the rear guide strip 2 and of the rear lateral frame part RB via hook-like holding portions 50 and 51 formed thereon. In such a way, the support part 5.2 of the cover element 5 is secured both to the rear guide strip 2 and to the rear lateral frame part RB of the window frame R with the aid of its holding portions 50 and 51. Also fixed to the support part 5.2 is a screen 5.1, which forms the outwardly visible surface of the cover element 5.

FIGS. 7A, 7B and 7C show further details of the closure part, configured as a door-frame strip 4, via which the insertion regions of the guide strips 1 and 2 and the set-back portions 7a and 7b of the upper frame part RC are closed after the window pane FS has been mounted. The door-frame strip 4 is in this case plugged onto the upper frame part RC. The elongate door-frame strip 4 then extends, after being fitted properly, with a front portion 41 as far as the sill region BR of the vehicle door T via the mirror triangle 11. This front portion 41 is adjoined toward the rear by a central portion 42 of the door-frame strip 4, which extends over the entire upper frame part RC and transitions into a rear portion 43 above the cover element 5. The door-frame strip 4 thus forms an outwardly visible upper periphery of the vehicle door T, said upper periphery likewise terminating flush with the closed window pane FS.

In this case, via the door-frame strip 4 fixed properly to the door-frame support T, the pane-side guide elements 3a and 3b are prevented from being pushed upward out of the frame-side guide strips 1 and 2, and so the window pane FS is only able to be mounted on the door-frame support TT from above for mounting purposes. Furthermore, an upper pane seal is provided or integrated at the door-frame strip 4 produced at least partially from a plastics material, rubber material or metal. The window pane FS travels into this pane seal during closing, or at least bears thereon, in order also to close the window opening O in a sealing manner in the region of the upper frame part RC via the closed window pane FS.

The perspective view in FIG. 8A illustrates the door-frame strip 4 with a pane seal 45, integrally formed thereon, for the pane upper edge SO. Furthermore, the door-frame strip 4 has a plurality of (in the present case three) integrally formed, for example injection-molded or vulcanized-on, molded parts 44.1, 44.2 and 44.3. The molded parts 44.2 and 44.3 provided in the region of a transition between the front portion 41 and the central portion 42 of the door-frame strip 4 and in the region of the end of the rear portion 43 of the door-frame strip 4 protrude in this case in the direction of the door case (downwardly) with the door-frame strip 4 fitted properly. These protruding molded parts 44.2 and 44.3 are each plugged from above into an associated guide channel 10 or 20 of the front or rear guide strip 1 or 2, in order to close said guide channel 10 or 20 upwardly. The molded part 44.1 provided at the front end of the door-frame strip 4 furthermore serves for defined abutment of the door-frame strip 4 in the sill region BR at the front end of the mirror triangle 11.

In the variant illustrated in FIG. 8B, no molded parts 44.1, 44.2 and 44.3 are integrally formed on the door-frame strip 4. Nevertheless, such a door-frame strip 4 with the pane seal 45 integrated thereon for the pane upper edge SO of the window pane FS also assumes, in addition to a closure function at the insertion regions of the guide strips 1 and 2 and the set-back portions 7a and 7b of the upper frame part RC, a sealing function for the window pane FS present in its closed state.

The sectional illustration in FIG. 9 depicts, in more detail, a door-frame strip 4 fitted on the upper frame part RC, in a manner corresponding to FIGS. 8A and 8B with regard to an exemplary structure. Thus, the door-frame strip 4 in this case has a rigid, preferably metal inlay 46, via which fixing to the upper frame part RC takes place. The elongate rigid inlay 46 is surrounded by a plastics material which forms the pane seal 45. Via this pane seal 45, a sealing channel 40 is defined, which is bounded by a sealing lip. When the window pane FS is closed, the window pane FS travels with its pane upper edge SO into this sealing channel 40, wherein the sealing lip then bears against a pane inner side in order to prevent in particular the penetration of drafts into the vehicle interior via the pane upper edge SO.

FIGS. 10A and 10B depict a further embodiment variant of a vehicle-door assembly according to the invention, in which a closure part 4* simultaneously also forms the upper frame part of the window frame R of the door-frame support TT after the window pane FS, with the pane-side guide elements 3a and 3b fixed thereto, has been mounted on the door-frame support TT from above.

The door-frame support TT, with its door outer panel TAB, in this case has an upwardly open window frame R. Only the lateral frame parts RA and RB with the frame-side guide elements, formed or provided thereon, in the form of the guide strips 1 and 2 are already provided here on the door-frame support TT in order to define the window opening O of the vehicle door T before the window pane FS is mounted thereon. In such a way, the pane-side guide elements 3a, 3b can be positioned without problems from above in the associated guide channels 10, 20 of the guide strips 1 and 2, and the window pane FS can thus be threaded into the door-frame support TT from above. If the window pane FS is held in a displaceable manner on the door-frame support TT via the pane-side and frame-side guide elements 1, 2, 3a, 3b cooperating with one another, the closure part 4*, which in the present case forms a part of the rigid window frame R of the vehicle door T, is fitted from above.

In this case, the closure part 4* forming the upper frame part has an elongate metal profile which, in the properly fitted state, extends over the window opening O and closes the latter upwardly. In order to be rigidly connected to the front and rear lateral frame parts RA and RB, the closure part 4* has connecting portions 44.2* and 44.3*, for example in the form of gusset plates, that protrude in the direction of the door case of the door-frame support TT. Via these connecting portions 44.2* and 44.3*, after the closure part 4* has been positioned, the closure part 4* is rigidly connected to the lateral frame parts RA, RB of the door-frame support TT.

In this variant, too, provision can understandably be made for the closure part 4* already to have a pane seal for the pane upper edge S of the window pane FS before said closure part 4* is mounted on the door-frame support TT. Likewise, the closure part 4* can already bear an element of the vehicle door T that is visible on the exterior body, or integrate such an element. Alternatively, a separate cover element can also be fitted on the closure part 4* after the closure part 4* has been connected to the lateral frame parts RA and RB.

In principle, it is preferred here for the open ends, provided on the guide strips 1 and 2, for the positioning of the pane-side guide elements 3a and 3b to already be closed by the closure part 4* forming the upper frame part. In one possible development, however, it is possible for corresponding closing to take place via a subsequently fitted (additional) closure part, which forms, on the upper door frame of the vehicle door T, a surface that is visible on the exterior body.

Figure 11:
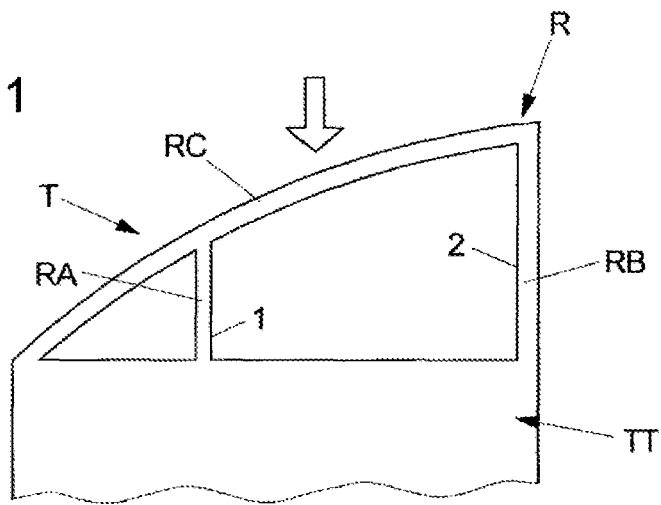
FIG. 11 schematically shows a side view of the vehicle door in FIGS. 2 and 10B.

FIG. 11 again schematically depicts the basic principle of a vehicle-door assembly according to the invention and of a corresponding mounting method according to the invention. In this case, a window frame R of a vehicle door T has two mutually opposite frame parts RA and RB at which lateral guidance of the adjustable window pane FS takes place, which is flush with upper and/or lateral body parts in a closed state.

According to one variant, at least one set-back portion is provided on an upper frame part RC connecting these two lateral frame parts RA and RB. Via said set-back portion, it is then possible to insert the window pane FS from above in an insertion region, provided above a sill region BR, on the lateral frame parts RA and RB. At least one closure part for closing the insertion regions provided for mounting and the set-back portions of the upper frame part RC is then fitted on the upper frame part RC (cf. in particular FIGS. 1 and 2).

In order to allow the positioning of pane-side guide elements from above, optionally together with the window pane FS, it is otherwise possible to also configure the upper frame part RC in a separately mountable manner, such that the window frame R of the door-frame support TT of the vehicle door T is initially open for mounting from above (cf. FIGS. 10A and 10B).

Figure 12:
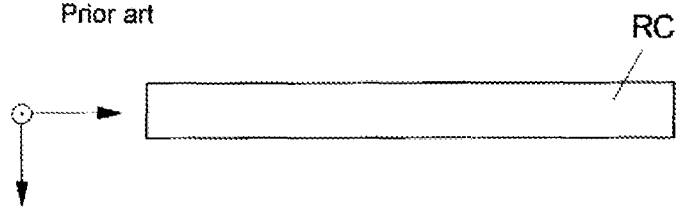
FIG. 12 shows a schematic plan view from above of an upper frame part according to the prior art.
Figure 13A:
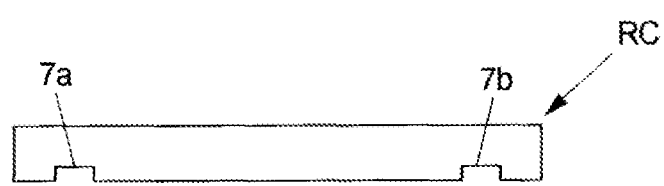
FIGS. 13A-13C schematically show, in plan view, different designs of an upper frame part for possible embodiment variants of a vehicle-door assembly according to the invention.

The solution according to the invention therefore differs from vehicle doors previously used in flush-mounted pane concepts and in particular the door-frame supports thereof. Thus, in practice, an upper frame part RC is configured in each case in a manner corresponding to FIG. 12 such that, in a closed state of the window pane FS, it is flush with the pane upper edge SO of the window pane FS. By contrast, a solution according to the invention in this case provides, for example, for an upper frame part RC to be formed with a set-back portion 7a or 7b at least locally in the region of the lateral frame parts RA and RB and associated frame-side guide elements. Such a variant is shown by way of example in FIG. 13A.

Figure 13B:
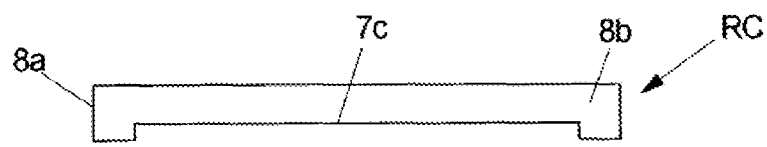

One possible alternative has an upper frame part RC which is embodied in a set-back manner along the majority of its length and thus in particular over virtually the entire region of the pane upper edge SO of the window pane FS. Accordingly, the upper frame part RC forms, for example, in a manner corresponding to FIG. 13B, a set-back portion 7c which extends along virtually the entire length of the upper frame part RC and is enclosed by two lateral ribs 8a and 8b of the upper frame part RC.

Figure 13C:
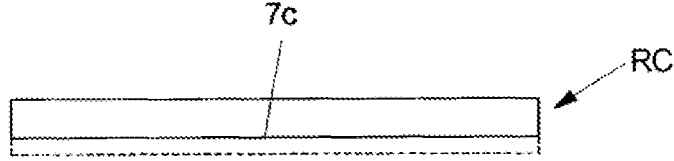

In a further alternative according to FIG. 13C, the upper frame part RC can also form a set-back portion 7c along its entire length, in order to allow the insertion, provided according to the invention, of pane-side guide elements from above in a flush-mounted pane concept.

With the solution according to the invention, it is also possible to mount a window pane FS that terminates flush with body parts bounding the window opening in its closed position on a vehicle door T which does not have a removable door outer skin. Rather, the installation of the window pane FS for a "flush glass" or "flush glazing" window lifting system is possible even in the case of a vehicle door T which has been produced according to a conventional two-shell door design. A door-frame support TT has in this case the door inner skin, and thus the door inner panel, and the door outer skin, and thus the door outer panel TAB, which is connected thereto firmly and in a non-removable manner, before the window pane FS is mounted on the door-frame support TT.

LIST OF REFERENCE SIGNS

1 1st guide strip (1st frame-side guide element)
10 Guide channel
11 Mirror triangle
12 Fastening channel
2 2nd guide strip (1st frame-side guide element)
20 Guide channel
30a, 30b Base
31a, 31.1b, 31.2b Guide portion
32b Spring portion
3a, 3b Guide element (pane-side guide element)
4 Door-frame strip (closure part)
4\* Closure part forming upper frame part
40 Sealing channel
41 Front portion
42 Central portion
43 Rear portion
44.1, 44.2, 44.3 Molded part
44.2\*, 44.3\* Connecting portion
45 Pane seal
46 Inlay
5 Cover element
5.1 Screen
5.2 Support part
50, 51 Holding portion
6 Gap seal (sealing element)
62 Fastening portion
70 Additional recess
7a, 7b, 7c Set-back portion
8a, 8b Rib
A Pane adapter
BR Sill region
FS Window pane
O Window opening
R Window frame
RA 1st lateral frame part
RB 2nd lateral frame part
RC Upper frame part
SA, SB Lateral pane edge
SO Pane upper edge
SU Pane lower edge
T Vehicle door
TAB Door outer panel
TT Door-frame support

The invention claimed is:
1. A vehicle-door assembly, comprising:
a window pane that is adjustable by a vehicle window lifter, wherein the window pane, in a closed state, is flush with at least one of upper and lateral body parts that bound a window opening to be closed by the window pane of a vehicle door;
a door-frame support which defines a door case beneath the window opening, the window pane configured to be lowered into said door case in order to be opened, the door-frame support having at least two lateral frame parts that are located opposite one another above the door case at the window opening;
a first frame-side guide element for laterally guiding the window pane at one of the at least two lateral frame parts, and a second frame-side guide element for laterally guiding the window pane at another one of the at least two lateral frame parts, and
first and second pane-side guide elements holding the window pane in a displaceable manner on the frame-side guide elements,
wherein, in order to mount the window pane on the door-frame support, the first frame-side guide element above the door case has a first insertion region by which first insertion region the first pane-side guide element is positionable from above on the first frame-side guide element, and the second frame-side guide element above the door case has a second insertion region by which second insertion region the second pane-side guide element is positionable from above on the second frame-side guide element, and
wherein the vehicle-door assembly further comprises at least one closure part for closing at least one of the first and second insertion regions of the first and second frame-side guide elements after having positioned the first and second pane-side guide elements on the first and second frame-side guide elements.

2. The vehicle-door assembly as claimed in claim 1, wherein at least one of the first and second frame-side guide elements is formed by a lateral frame part.

3. The vehicle-door assembly as claimed in claim 1, wherein at least one of the first and second frame-side guide elements is formed by a separate component that is fixed to a lateral frame part.

4. The vehicle-door assembly as claimed in claim 1, wherein both the first insertion region of the first frame-side guide element and the second insertion region of the second frame-side guide element are closed via a properly fitted closure part.

5. The vehicle-door assembly as claimed in claim 1, wherein at least one of the first and second insertion regions is formed by a profiled upwardly open end region of the first or second frame-side guide element.

6. The vehicle-door assembly as claimed in claim 1, wherein an upper frame part is provided, which connects the first and second lateral frame parts above the door case together.

7. The vehicle-door assembly as claimed in claim 6, wherein the at least one closure part is to be arranged in the region of the upper frame part.

8. The vehicle-door assembly as claimed in claim 6, wherein the upper frame part forms, in the first or second insertion region, a portion that is set back with respect to an adjoining portion of the upper frame part or with respect to an adjoining portion of a lateral frame part.

9. The vehicle-door assembly as claimed in claim 8, wherein the set-back portion extends at the upper frame part along a length that is greater than half the distance between the first and second lateral frame parts.

10. The vehicle-door assembly as claimed in claim 8, wherein the portion that is set back is set back substantially perpendicularly or substantially parallel to a pane plane along which the mounted window pane extends in the closed state.

11. The vehicle-door assembly as claimed in claim 6, wherein the at least one closure part forms at least a part of the upper frame part.

12. The vehicle-door assembly as claimed in claim 1, wherein at least one portion that protrudes in the direction of the door case in the properly fitted state of the closure part is provided on the closure part.

13. The vehicle-door assembly as claimed in claim 12, wherein the at least one protruding portion, with the closure part fitted properly, partially or completely closes at least one of the first or second insertion regions, or wherein the at least one protruding portion, with the closure part fitted properly, partially or completely covers at least one of the first or second insertion regions.

14. The vehicle-door assembly as claimed in claim 12, wherein the at least one protruding portion is provided to connect the closure part to one of the lateral frame parts.

15. The vehicle-door assembly as claimed in claim 1,
wherein the closure part has a seal for a pane upper edge of the window pane.

16. The vehicle-door assembly as claimed in claim 1, wherein, with a vehicle door installed properly in a vehicle, the first lateral frame part is arranged in the region of an A pillar of the vehicle and the second lateral frame part is arranged in the region of a B pillar of the vehicle.

17. The vehicle-door assembly as claimed in claim 16, wherein the closure part extends above a mirror triangle, provided in the region of the A pillar, of the vehicle door.

18. The vehicle-door assembly as claimed in claim 1, wherein the closure part is configured to be plugged into at least one of the first and second lateral frame parts or into an upper frame part that connects the first and second frame parts together.

19. The vehicle-door assembly as claimed in claim 1, wherein, when the closure part is fitted properly on the door-frame support, the closure part has an elongate strip element which forms an upper termination of the window opening, said upper termination being visible on the outer side of the vehicle door.

* * * * *